United States Patent [19]

Bergles

[11] 4,273,546
[45] Jun. 16, 1981

[54] BICYCLE CHAIN-SHIFTING DEVICE

[75] Inventor: Eduard Bergles, Graz, Austria

[73] Assignee: Fichtel & Sachs AG, Schweinfurt, Fed. Rep. of Germany

[21] Appl. No.: 61,065

[22] Filed: Jul. 26, 1979

[30] Foreign Application Priority Data

Aug. 8, 1978 [DE] Fed. Rep. of Germany ....... 2834646

[51] Int. Cl.³ ............................................ F16H 11/04
[52] U.S. Cl. ..................................................... 474/82
[58] Field of Search ......................... 474/78, 79, 81, 82

[56] References Cited

U.S. PATENT DOCUMENTS

| 3,903,751 | 9/1975 | Dian | 474/82 |
|---|---|---|---|
| 3,974,707 | 8/1976 | Nagano | 474/82 |
| 4,030,375 | 6/1977 | Nagano | 474/82 |
| 4,106,356 | 8/1978 | Nagano et al. | 474/82 |
| 4,132,119 | 1/1979 | Nagano et al. | 474/82 |
| 4,185,510 | 1/1980 | Juy | 474/82 |

FOREIGN PATENT DOCUMENTS 2719241  11/1977  Fed. Rep. of Germany .......... 74/217 B Primary Examiner—C. J. Husar
Assistant Examiner—Conrad Berman
Attorney, Agent, or Firm—Toren, McGeady and Stanger

[57] ABSTRACT

In a device for shifting the drive chain on a multi-speed bicycle, a unit having a plurality of concentrically arranged different diameter chain wheels is secured on the axle of the bicycle's driven wheel. A chain trained over one of the chain wheels, passes over a chain guide wheel, and is rotatably supported on a movable support member. By displacing the chain guide wheel, the chain can be moved onto a selected chain wheel. A linkage arrangement is connected to the movable support member and to an adjusting switch for selecting one of the chain wheels. The linkage arrangement includes a first linkage part connected to the movable support member and a second linkage part articulated to the first linkage part so that the two parts are movable relative to one another. A cam disc is mounted on the second linkage part and a cam disc follower is mounted on the first linkage part. A readjustment spring forms a part of the guide device and acts on the first linkage part for maintaining the follower in contact with the cam disc.

19 Claims, 16 Drawing Figures

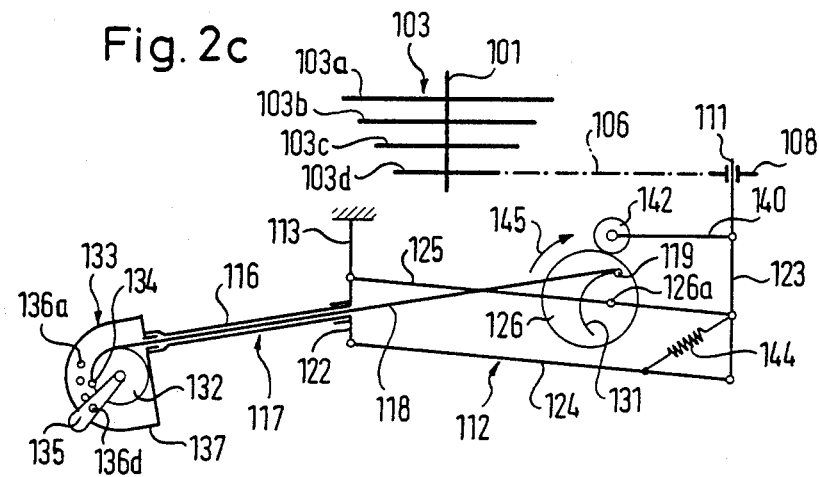
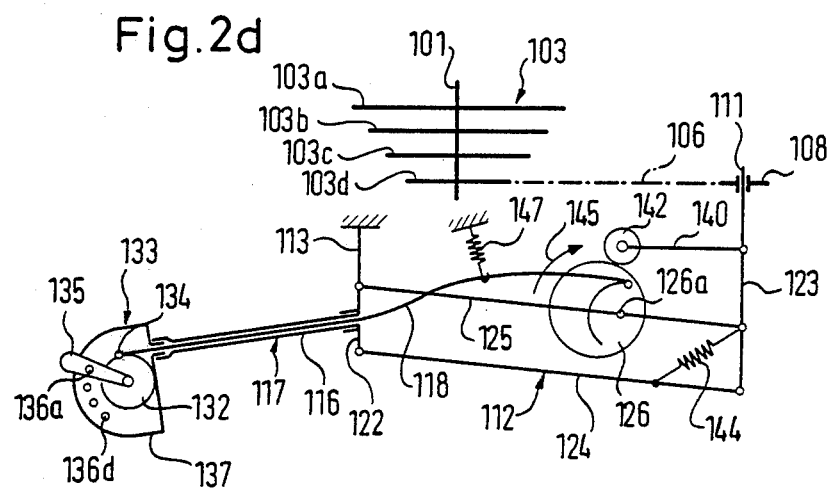

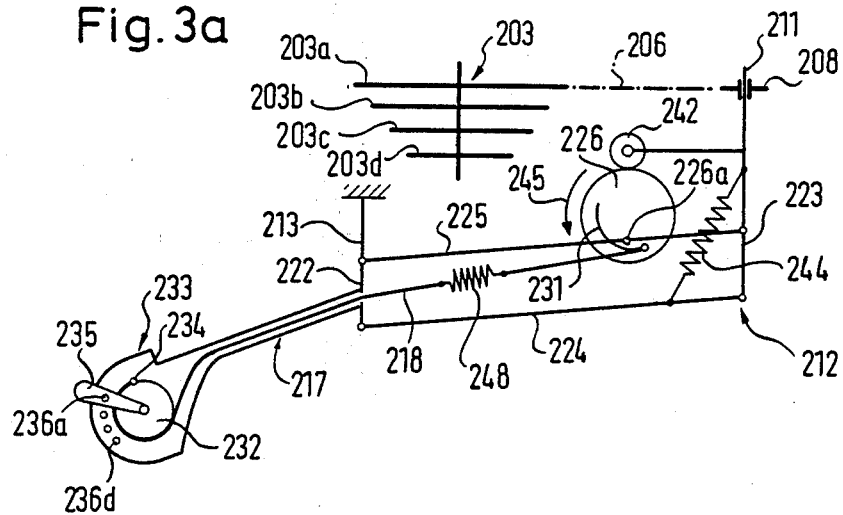
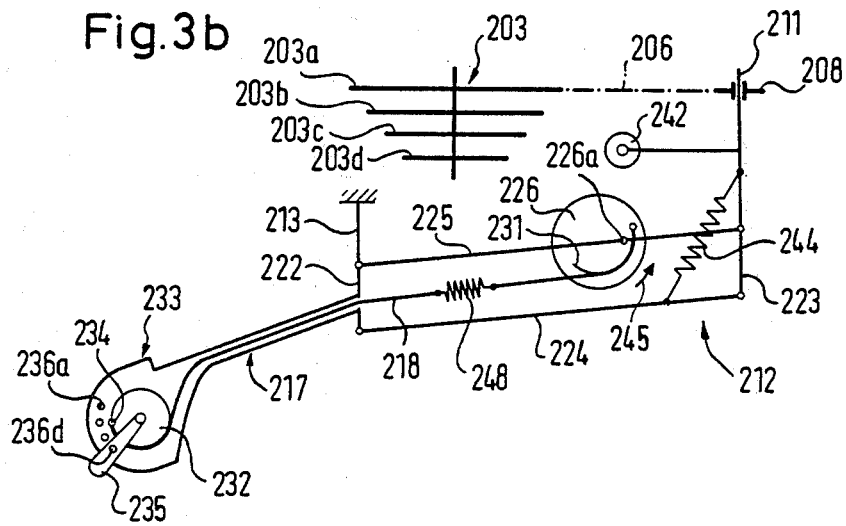

BICYCLE CHAIN-SHIFTING DEVICE

SUMMARY OF THE INVENTION

The present invention is directed to a chain-shifting device on a bicycle or the like and includes a chain wheel unit containing a number of chain wheels of different diameter and the chain wheels are concentrically positioned on the axle of the wheel to be driven. A chain guide wheel is spaced from the chain wheel unit. The chain wheels on the unit are arranged next to one another in the direction of the driven wheel axis. The axis of the chain guide wheel is substantially parallel to the axle of the driven wheel and it is rotatably supported on a movable support member. A guide device is secured to the frame of the bicycle and is connected to the movable support member for displacing it along a path of movement substantially parallel to the driven wheel axle. An adjusting switch is connected by a transmission member to the guide device for displacing the movable support member into different positions along its path of movement. Even though the movable support member is in a locked position when the drive chain is stationary, the adjusting switch can be moved into a new position with the movement being transmitted to the guide device by the transmission member. The guide device includes readjustment means for shifting the movable support member into position corresponding to the position of the adjusting switch when the locking action on the movable support member is cancelled as the drive chain commences movement.

Such a chain-shifting device is disclosed in German Offenlegungsschrift No. 27 19 241.

This known device is very complicated in its design.

Therefore, the primary object of the present invention is to provide a chain-shifting device of the above type which is simpler in its design.

In accordance with the present invention, the chain-shifting device has two interconnected parts which are movable relative to one another. One of the parts supports a cam disc which is rotatable about the cam disc axis by the transmission member. The cam disc can be rotated between two angularly spaced apart limiting positions. A cam disc follower is attached to the other one of the parts and the readjustment means maintains the cam disc follower in contact with the cam disc.

Another feature of the present invention is the positioning of the guide wheel in an exact shifting position corresponding to the position of the adjusting switch regardless of any unintentional movement of the parts of the chain-shifting device, for example, in the adjusting switch, in the transmission member or in the guide device. Providing the exact shifting position of the guide wheel assures problem-free guidance of the drive chain onto the selected chain wheel in accordance with the position of the adjusting switch.

In assuring the exact shifting of the drive chain, the cam disc is provided with a plurality of sections in the circumferential direction with each section having a constant radius and with the radius varying from section to section.

In this particular embodiment, even though unintentional changes occur, it is assured that the shifting positions of the movable support member remain unchanged, because the cam disc follower is maintained at a constant distance from the cam disc axis within the range of a given cam section, even when the cam disc follower contacts different points on the cam disc section. Accordingly, the need to readjust the chain shifting device is eliminated or at least reduced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawing:

FIGS. 2b to 2d illustrate the chain-shifting device of FIG. 2a in other shifting positions;

FIG. 3a is a schematic illustration of a second embodiment of the chain-shifting device incorporating the present invention, in a first shifting position, and viewed in the direction of the arrow II in FIG. 1;

FIGS. 3b to 3d exhibit other shifting positions of the chain-shifting device displayed in FIG. 3a;

DETAIL DESCRIPTION OF THE INVENTION

Figure 1:
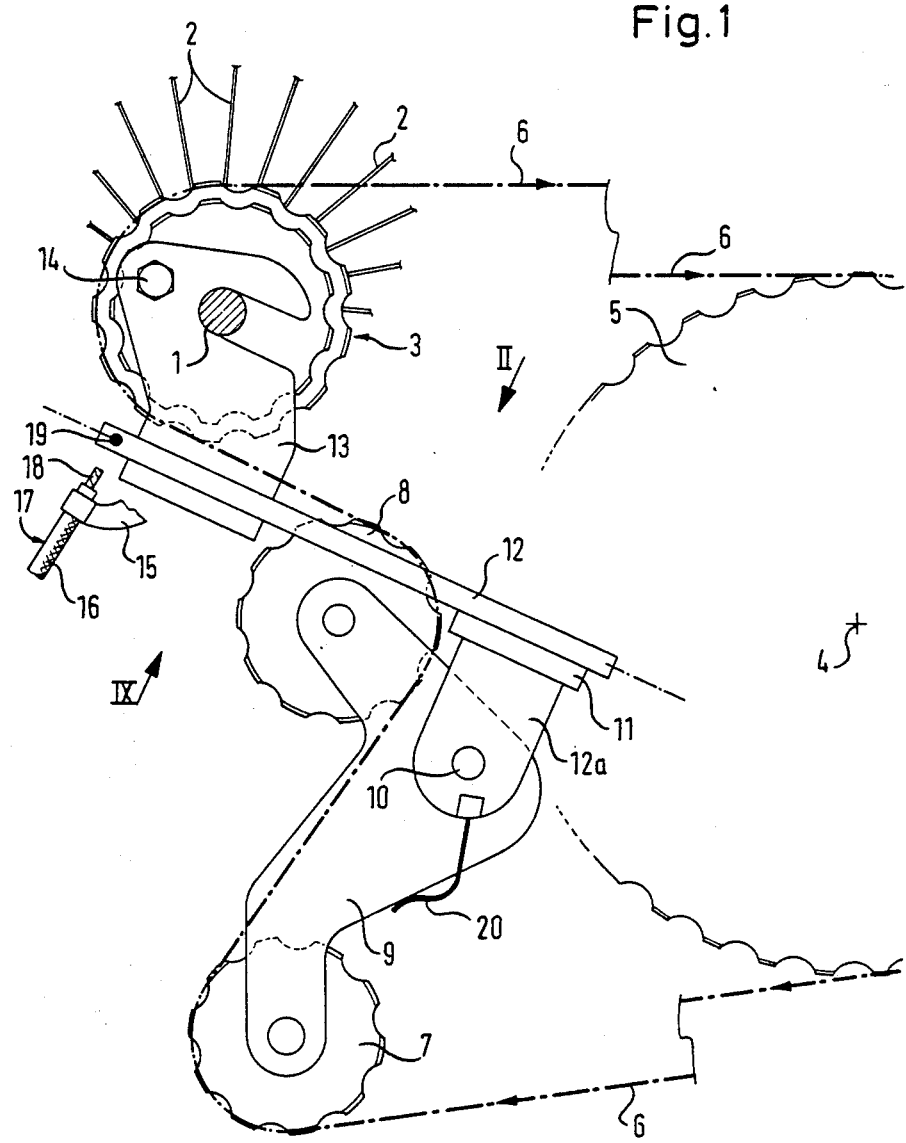
FIG. 1 is a partial side view of a bicycle illustrating a chain-shifting device embodying the present invention.

In FIG. 1 the rear or driven wheel axle 1 of a bicycle is shown and the rear wheel 2 rotatably supported on the axle 1 is represented by the radially extending spokes. A unit or assembly 3 of chain wheels or sprockets is positioned on the axle of the rear wheel so that the unit rotates with the rear wheel. Shown schematically in the right side of FIG. 1 is a bottom bracket 4 on which chain wheel 5 is rotatably supported. For sake of illustration, the rear wheel 2 and the chain wheel 5 are shown close together with the chain 6 shown broken. The chain 6 extends around the chain wheel 5 to one of the chain wheels of the unit 3. In addition, chain 6 is trained over a tension wheel 7 and a guide wheel 8. Both the tension wheel 7 and the guide wheel 8 are rotatably supported on a two-armed tension lever 9. Tension lever 9 is supported about an axis 10 on a lug 12a which, in turn, is supported by a movable support member 11. A guide device or system 12 movably guides the movable support member 11 in a direction perpendicular to the plane of FIG. 1. Guide device 12 is supported by a support member 13 fixed to the bicycle frame with the support member 13 fastened to the axle 1 of the rear wheel and also to the bicycle frame by a screw 14. Conduit 16 of a Bowden control 17 extends through an arm 15 fastened to the fixed support member 13. Pull wire 18 of the Bowden control 17 is connected to the guide device 12 at point 19. At point 19, the pull wire 18 extends substantially perpendicular to the plane of FIG. 1. The Bowden control 17 originates at an adjusting switch, not shown in FIG. 1. The guide device 12 is moved by the adjusting switch, not shown, through the Bowden control 17 so that the movable support member 11 is displaced substantially perpendicular to the plane of FIG. 1 and, in turn, the guide wheel 8 is displaced by the movable support member in the direction of the rear wheel axle 1. The movement of the guide wheel 8 in the direction of the rear wheel axle 1 effects the shifting of the chain 6 from one to another of the chain wheels in the unit 3. The chain always moves onto the chain wheel which is located in the same plane with the guide wheel 8, that is, parallel with the plane of FIG. 1. The chain can only jump from one chain wheel to another in the chain wheel unit 3 when the chain 6 is in motion. In other words, the chain 6 cannot be shifted from one chain wheel to another when the chain is stationary. Nevertheless, it is desirable to change the shift positions on the adjusting switch, not shown in FIG. 1, even when the chain stands still so that when the chain is placed in motion it will jump onto the chain wheel corresponding to the selected switch position of the adjusting switch. The present invention is directed to the structural arrangement of the parts for moving the chain and is described in detail with regard to the illustration provided in the other figures in the drawing.

As is indicated in FIG. 1, the individual chain wheels of the unit 3 have different numbers of teeth and different diameters and a tensioning device is required for the chain. Tension wheel 7 and tension lever 9 form this tensioning device. A leaf spring 20, fastened to the lug 12a, pretensions the tension lever in a clockwise direction as viewed in FIG. 1, so that the tension wheel maintains the chain 6 under tension. To compensate for the different diameters of the chain wheels in the unit 3, the tension lever can be pivoted about the axis 10 against the force of the leaf spring 20.

Figure 2A:
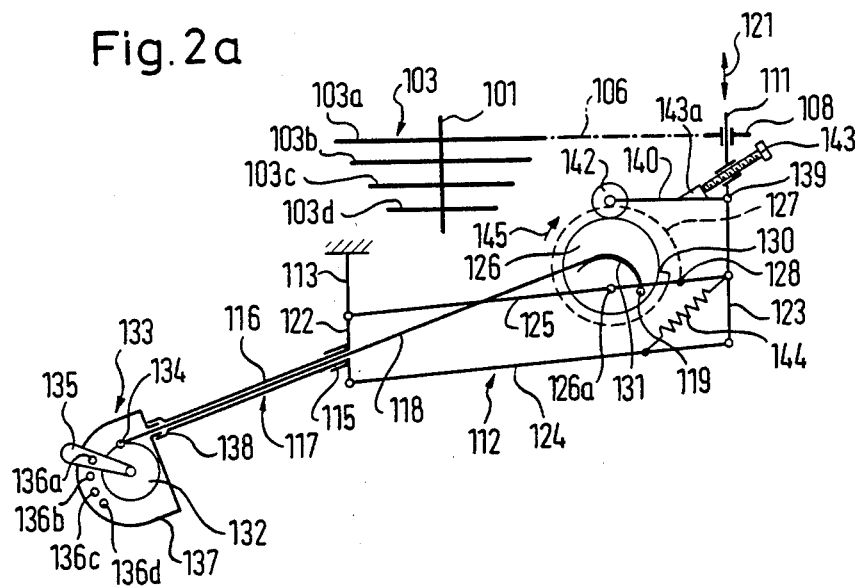
FIG. 2a is a schematic illustration of a first embodiment of the chain-shifting device incorporating the present invention, in a first shifting position, and viewed in the direction of the arrow II in FIG. 1.

In the schematic illustration in FIG. 2a, parts similar to those illustrated in FIG. 1, have the same reference numerals, however, 100 has been added to the reference numeral of FIG. 1. In FIG. 2a the chain wheel unit 103 consists of chain wheels 103a–103d and these wheels are rotatably supported on the rear wheel axle 101. Further, chain 106 runs over the chain guide wheel 108. Guide wheel 108 is rotatably supported on the movable support member 111. Movable support member 111 is displaceably guided by guide system 112 which includes a fixed support member 113. The guide device effects the movement of the guide wheel 108 in the direction of the double arrow 121. The guide device 112 consists of a fixed link member 122 rigidly connected to the fixed support member 113. In addition, the guide device includes a movable link member 123 spaced from the fixed link member 122 with a connecting rod 124 and another connecting rod 125 extending between the two link members. The link members 122, 123 and the connecting rods 124, 125 form a link parallelogram. The link parallelogram is displaceable in the plane of FIG. 2a, so that the movable support member 111 can be moved in the direction of the double arrow 121 in FIGS. 2a. A cam disc 126 is supported on the connecting rod 125 and is rotatable about a cam disc axis 126a. An elongated spiral spring 127 is connected at one end 128 to the connecting rod 125 and its other end 130 is connected to the cam disc 126. Spiral spring 127 biases cam disc 126 for rotation in a clockwise manner as viewed in FIG. 2a. Rigidly arranged on the cam disc 126 is an arched wire guide 131 on which one end of the pull wire 118 of the Bowden control 117 is attached. One end 119 of the pull wire is secured to the cam disc 126 while the other end 134 is fastened to a rotating member 132 of adjusting switch 133. An adjusting lever 135 is connected to the rotating member 132. Adjusting lever 135 has a locking bolt engageable in holes 136a–136d in the adjusting switch housing 137. Conduit 116 of the Bowden control 117 bears against the link 122 at the opening 115 and against the adjusting switch housing 137 at the end 138.

A support arm 140 is articulated to the link member 123 at hinge point 139 and at its free end, spaced outwardly from the link member 123, a cam disc follower 142 is positioned. The cam disc follower 142 is in engagement with the circumferential periphery of cam 126. The position of the support arm 140 can be adjusted by an adjusting screw 143 mounted on the link member 123 and having a stop 143a in engagement with the support arm 140. A readjusting spring 144 is attached at one end to the connecting rod 124 and at its other end to the link member 123 at its point of articulation with the connecting rod 125.

In the shifted position illustrated in FIG. 2a, chain 106 runs over the largest chain wheel 103a. This position is determined by the position of the chain guide wheel 108. In turn, the position of the guide wheel 108 is determined by the link parallelogram or guide device 112 formed by the link members 122, 123 and the connecting rods 124, 125 extending between them. The relationship between the link members and the connecting rods is determined by the adjustment of the cam disc 126 about its axis 126a, since the position of the cam disc 126 determines the position of the cam disc follower 124 relative to the cam disc axis 126a. The angular adjustment of the cam disc 126 about its axis 126a is determined by the movement of the adjusting lever 135 in relation to the holes 136a–136d in the adjusting switch housing 137. As viewed in FIGS. 2a–2d, spiral spring 127 biases the cam disc 126 in the clockwise direction about the cam disc axis 126a until the pull wire 118 is tensioned. In FIG. 2a, with the adjusting lever 135 secured in the hole 136a, the cam disc 126 is in one of its limiting angular positions in which the spiral spring 127 is relatively untensioned, however, there is a certain tension acting on the cam disc 126 and, therefore, on the pull wire 118. In FIG. 2a, this slight residual tension is indicated by the short arrow 145. Further, the readjusting spring 144 keeps the cam disc follower 142 in engagement with the circumferential periphery of the cam disc 126.

Figure 2B:
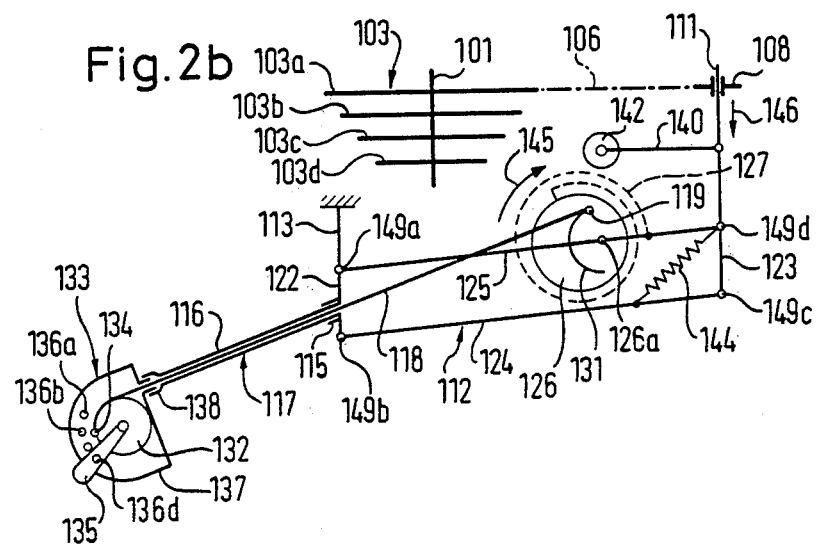

For the sake of simplicity in the drawing, certain details have been omitted from FIGS. 2b–2d.

In FIG. 2c, the adjusting lever 135 is moved into the opposite end notch 136 of the switch housing 137, that is, the opposite limiting end of the adjustable movement of the lever 135. As a result, disc 126 has been rotated in the counterclockwise direction relative to the position displayed in FIG. 2a. Due to the readjusting spring 144, the cam follower 142 has moved in contact with the circumferential periphery of the cam disc closer to its axis of rotation 126a. Relative to the position shown in FIG. 2a the link parallelogram or guide device 112 constituting the parts 122, 123, 124 and 124 has been deformed moving the guide wheel 108 into alignment with the chain wheel 103d.

If the displacement of the adjusting switch 133 from the position in FIG. 2a to the position in FIG. 2c occurs during pedaling of the bicycle, that is, while the chain is moving, the cam disc follower 142 immediately follows the cam disc 126 into the position illustrated in FIG. 2c, because the moving chain jumps without any delay from the chain wheel 103a to the chain wheel 103b when the guide wheel 108 moves from the position in FIG. 2a into the position in FIG. 2c.

If the movement of the adjusting switch 133 from the position in FIG. 2a to the position in FIG. 2c occurs while the chain is stationary, initially the position in FIG. 2b is reached.

As can be noted in FIG. 2b, the cam disc 126 has been rotated about the cam disc axis 126a introducing a higher tension into the spiral spring 127, such higher tension being indicated by the longer arrow 145. The cam disc follower 142, however, remains in the position displayed in FIG. 2a and is no longer in contact with the circumferential periphery of the cam disc 126. The reason for this arrangement is that, in spite of the force afforded by the readjusting spring 144 on the guide wheel 108 in the direction of the arrow 146, the chain remains in the stationary position and is unable to jump from the chain wheel 103a. Accordingly, the entire link parallelogram consisting of the parts 122, 123, 124 and 125 together with the cam disc follower 142, the movable support member 111 and the guide wheel 108 remains in the same position as shown in FIG. 2a, note FIG. 2b.

Only when the chain 106 is placed in motion by pedaling, can it move from the chain wheel 103a to the chain wheel 103d under the influence of the guide wheel 108 which is tensioned in the direction of the arrow 146 by the readjusting spring 144. Accordingly, the readjusting spring 144 is untensioned and the cam disc follower 142 jumps from the position in FIG. 2b into the position in FIG. 2c and again contacts the circumferential periphery of the cam disc 126. The fact that the readjusting spring 144 has less tension in FIG. 2c than in the positions in FIGS. 2a and 2b is indicated by the shorter length of the spring.

If the movement from the position in FIG. 2c into the position in FIG. 2a is effected during pedaling, that is, while the chain is in motion, the adjusting lever is moved from the position in FIG. 2c into the position in FIG. 2a and once again is locked. As a result, the cam disc 126 is turned by the spiral spring 127 in the clockwise direction as viewed in the drawing and the spiral spring is once again untensioned, the untensioning is indicated by the transition from the long arrow 145 in FIG. 2c to the shorter arrow 145 in FIG. 2a. When the cam disc is rotated back to this position, the pull wire 118 is kept under tension by the released tension in the spiral spring 127. The cam disc follower 142 is pushed by the cam disc 126 into the position illustrated in FIG. 2a so that the readjusting spring 144 is pretensioned by the untensioning spiral spring 127 as indicated by the change in the length of the spring 144 from the relatively short length in FIG. 2c to the somewhat longer length in FIG. 2a.

When the adjusting spring 133 is moved back, however, from the position in FIG. 2c into that in FIG. 2a while the chain is stationary, the guide wheel 108 and the entire link parallelogram formed by the parts 122, 123, 124 and 125 is initially locked in the position shown in FIG. 2c, because the chain cannot jump from the chain wheel 103d to the chain wheel 103a when it is stationary. Since the link parallelogram is locked in the position shown in FIG. 2c, the cam disc 126 cannot be turned in the clockwise direction, although the pull wire 118 releases the cam disc for rotation and the spiral which is still under high tension as indicated by the longer arrow 145 tends to turn the cam disc in the clockwise direction. Initially, the arrangement of the guide device 112 is as displayed in FIG. 2d in which the link parallelogram formed by the parts 122, 123, 124 and 125, and the cam disc 126 and the cam disc follower 142 maintain the same positions as in FIG. 2c with the pull wire 118 buckled. To prevent the buckled pull wire from performing uncontrolled and undesired movements, a tightening device 147 is provided which acts on the pull wire.

When the chain is once again placed in motion by pedaling, the transition from the position in FIG. 2d to the position in FIG. 2a takes place. During such transition, the cam disc follower 142 is pressed back into position as in FIG. 2a by means of the cam disc 126 under the influence of the highly tensioned spiral spring 127 as indicated by the longer arrow 145, and the readjusting spring 144 is once again tensioned by the stronger spiral spring 127.

It should be noted that the movable support member 111 forms a rigid unit with the link member 123 and the support arm 140 is rigidly attached to the link member 123 by means of the adjusting screw 143. When the adjusting screw 133 is displaced, the positions of the cam disc follower and, therefore, of the guide wheel can be corrected by an adjustment of the adjusting screw 143.

The embodiment in FIGS. 3a–3d is similar to the embodiment displayed in FIGS. 2a–2d, with the similar parts having the same reference numerals with the addition of 100.

In FIG. 3a, the spiral spring is not shown for purposes of simplification, however, it is strongly tensioned so that it biases the cam disc 226 in the counterclockwise direction, the intensity of the tension is indicated by the length of the arrow 245. At the same time, the readjusting spring 244 is also strongly tensioned as exhibited by its extended length. Storage spring 248, a very hard tension spring, located in the pull wire 218, is not significantly extended.

Figure 3C:
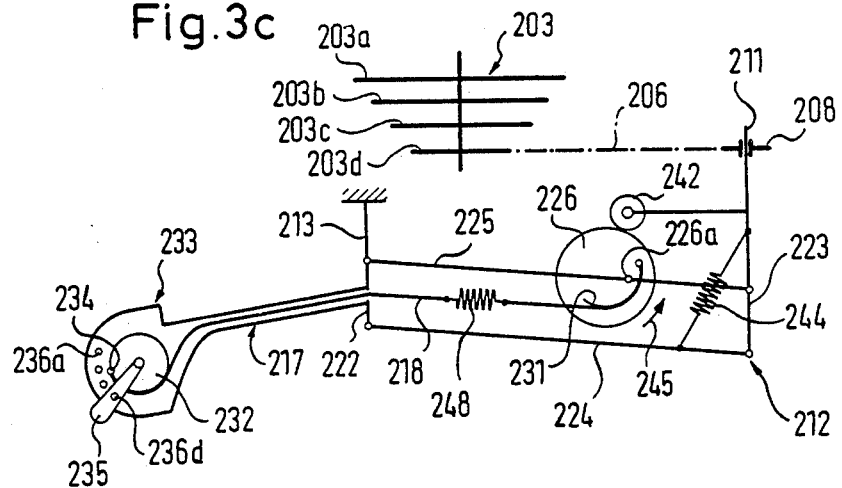

When the adjusting lever 235 is moved during the movement of the chain 206 into the position as set forth in 3c, the cam disc is turned counterclockwise and the tension in the spiral spring is released and, accordingly, the tension in the readjusting spring 244 is also released and the chain jumps easily onto the chain wheel 203d. If, the adjusting lever 235 is shifted from the position in FIG. 3a to the position in FIG. 3c while the chain is not moving, the chain cannot jump from the chain wheel 203a to the chain wheel 203d. As shown in FIG. 3b, the link parallelogram formed by parts 222, 223, 224 and 225, the cam disc follower 242 and the guide wheel 208 remain in the positions demonstrated in FIG. 3a. By releasing the tension of the spiral spring, the cam disc is turned into the position shown in FIG. 3d, the pull wire 218 is tightened and the cam disc is separated from contact with the cam disc follower 242. Initially, the readjusting spring 244 remains in the tensioned condition. When the chain again commences to move, it jumps from a chain wheel 203a onto the chain wheel 203d and the link parallelogram is rearranged from the position of FIG. 3d to the position of FIG. 3c by the readjusting spring 244 which is tensioned in FIG. 3d and whose tension is released during the transition from the position of FIG. 3d into the position of FIG. 3c. During such movement, the cam disc follower 242 again moves into contact with the circumferential periphery of the cam disk 226.

When the shifting device is to be returned from the position of 3c to the position of FIG. 3a, the shift is easily accomplished when the chain is in motion by moving the adjusting lever 235 from the opening 236d into the opening 236a. Accordingly, the cam disc 226 is rotated, the cam disc follower 242 follows directly after the cam disc 226, the spiral spring, not shown, is tensioned so that it again is placed under a high tension as indicated by arrow 245 in FIG. 3a, the readjusting spring 244 is also tensioned as indicated by its extended length in FIG. 3a as compared to FIG. 3c, the guide wheel 208 is aligned with the chain wheel 203a and the chain jumps onto the chain wheel 203a.

If the chain is not moving during the shift of the adjusting switch from the position in FIG. 3c to the position in FIG. 3a, the arrangement of the shifting apparatus is as shown in FIG. 3b. Since the chain is stationary, it cannot jump from the chain wheel 203d to the chain wheel 203a, the link parallelogram formed by the parts 222, 223, 224, and 225 is locked, and starting from the position as in FIG. 3c, the cam disc 226 cannot rotate, since the contact with the cam disc follower 242 counteracts such rotation. When the adjusting lever 235 is turned from the position in FIG. 3c to the position in FIG. 3d, this is possible, as can be seen in FIG. 3d, only by an extension of the storage spring 248 which, accordingly, has an increased length in FIG. 3d as compared to FIG. 3c.

Figure 3D:
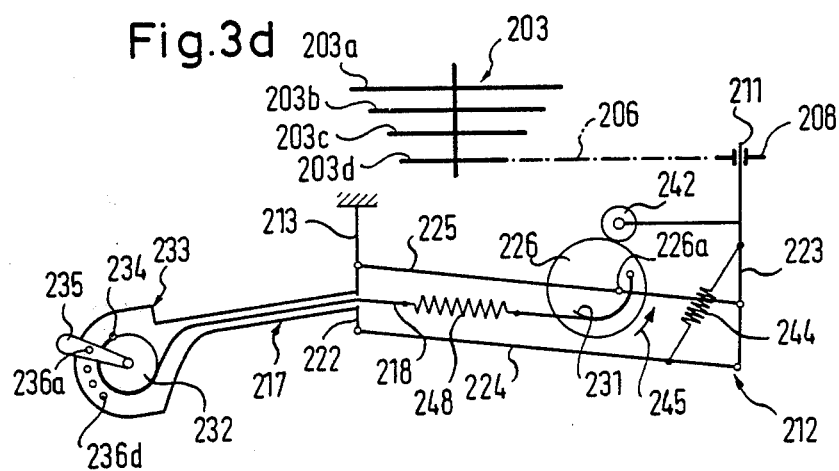

When the chain 206 again commences to move, it can jump from the position in FIG. 3d into the position in FIG. 3a. This movement of the chain is effected by a storage spring 248, because the tension in the storage spring is released and returns from the position in FIG. 3d into the untensioned position in FIG. 3a. As a result, the storage spring 248 rotates the cam disc 226 in the clockwise direction and the spiral spring, not shown, acting on the cam disc is again tensioned and the returning force as indicated by the arrow 245 is increased. Due to the rotation of the cam disc 226, the cam disc follower is displaced from the position in FIG. 3d to the position in FIG. 3a and the guide wheel 208 moves into alignment with the chain wheel 203a with the chain being able to jump to the chain wheel 203a. At the same time, the readjusting spring 244 is tensioned, note its length in FIG. 3a as compared to FIG. 3d. Accordingly, the storage spring 248 must store that amount of energy which, when its tension is released, the spiral spring acting on the cam disc 226 and the readjusting spring 244 can be tensioned.

With regard to the description of FIGS. 2a–2d and 3a–3d, it should be noted that the readjusting springs 144 or 244 are not absolutely required. For example, in the embodiment of FIGS. 2a–2d, the function of the readjusting spring 144 can be taken over by the spiral spring 127. It can be clearly seen that the force acting in FIG. 2d in the pull wire 118 corresponds to the highly tensioned spiral spring 126 in FIG. 2d and acts in the same manner on the link parallelogram formed by parts 122, 123, 124 and 125 in the same manner as the readjusting spring 144. Accordingly, the readjusting spring could be omitted. The necessary requirement for omitting the readjusting spring is that the line of action of the pull wire 118 may not simultaneously extend through the linkage points 149a, 149d or through the linkage points 149b, 149c.

Figure 4:
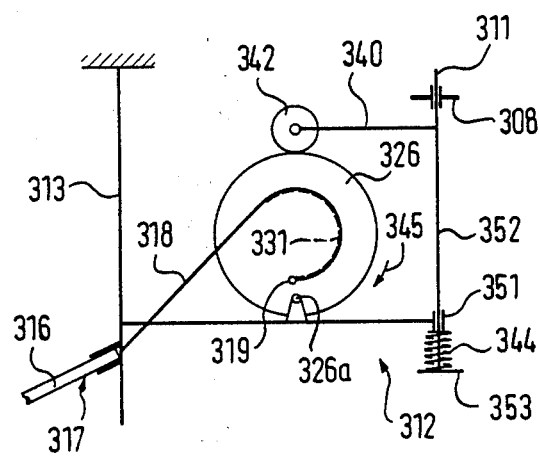
FIG. 4 is a schematic illustration of a third embodiment of the chain-shifting device incorporating the present invention and shown in a first shifting position.
Figure 5:
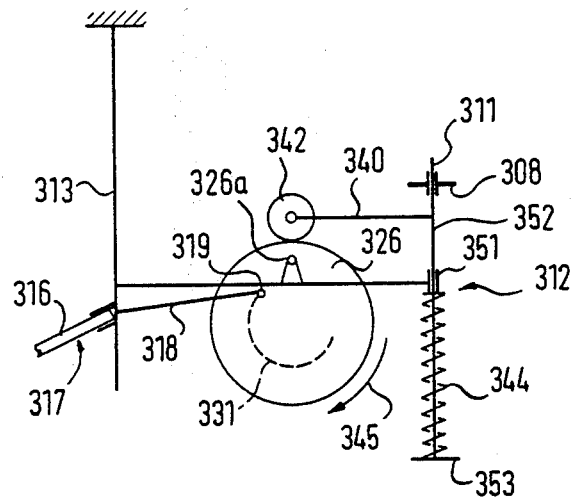
FIG. 5 is another position of the chain-shifting device shown in FIG. 4.

In the embodiment shown in FIGS. 4 and 5, parts similar to those in the other embodiments have the same reference numerals as in FIGS. 2a–2d, however, with the addition of 200. In the embodiment of FIGS. 4 and 5 however, the guide device or system 312 is different from that in the embodiment in FIGS. 2a–2d. In FIGS. 4 and 5, the guide system 312 is formed by a linear guide sleeve 351 and is supported laterally from the fixed support member 313. Linear guide rod 352 is guided in the linear guide sleeve 351. The end of the linear guide rod 352 spaced from the linear guide sleeve 351 carries the movable support member 311 on which the guide wheel 308 is rotatably mounted. The spiral spring acting on the cam disc 326 is not shown, however, the spiral spring is shown schematically by the arrow 345. In the position in FIG. 4, the spiral spring is only slightly tensioned as demonstrated by the relatively short arrow 345. In the position in FIG. 5, however, the spiral spring is strongly tensioned as displayed by the relatively long arrow 345. In the embodiment of FIGS. 4 and 5, a compression spring 344 acts as the readjusting spring, the compression spring acts between the linear guide sleeve 351 and a spring plate 353 located on the lower end of the linear guide rod 352.

The shifted position in FIG. 4 corresponds to the shifted position in FIG. 2a, while the shifted postion in FIG. 5 corresponds to the shifted position in FIG. 2c. The intermediate positions corresponding to FIGS. 2b and 2d are not illustrated, however, they also occur in the embodiment to FIGS. 4 and 5 if the shifting operation takes place while the chain is not moving.

Figure 6:
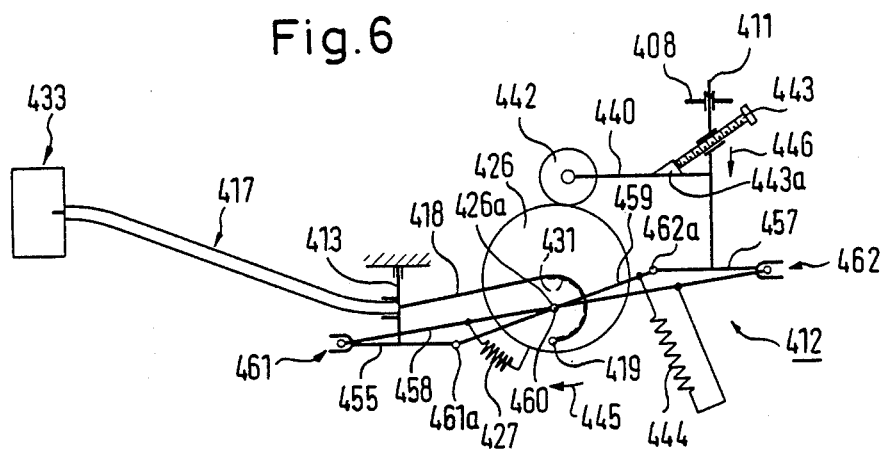
FIG. 6 is a schematic illustration of a fourth embodiment of the chain-shifting device incorporating the present invention and shown in a first shifting position.
Figure 7:
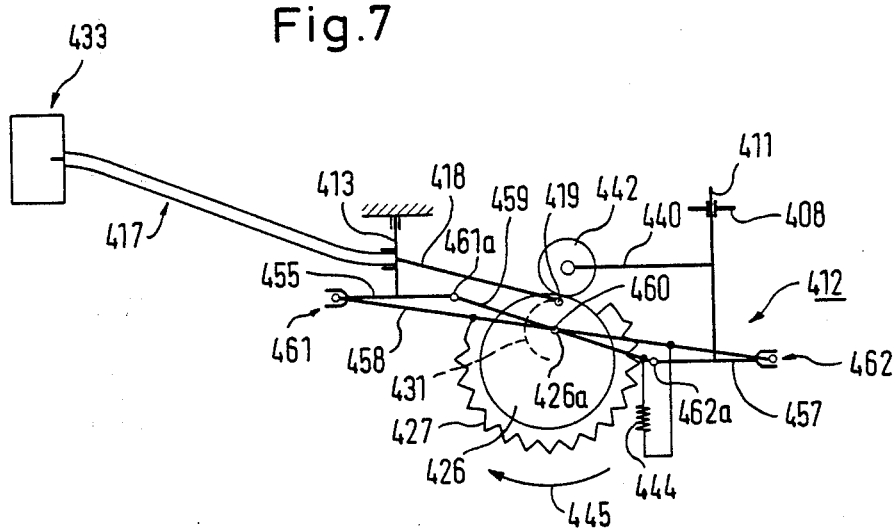
FIG. 7 displays another position of the chain-shifting device illustrated in FIG. 6.

In FIGS. 6 and 7 another embodiment of the shifting apparatus is illustrated with the parts similar to those in FIGS. 2a–2d having the same reference numerals but with the addition of 300.

The difference in FIGS. 6 and 7, as compared to the other embodiments, involves a different arrangement of the guide system 412.

In FIGS. 6 and 7, the guide system 412 includes a fixed link member 455 rigidly fixed to and extending laterally of one end of the fixed support member 413. A movable link member 457 is rigidly connected to the end of the movable support member 411 spaced from the guide wheel 408. In addition, a long connecting rod 458 and a short connecting rod 459 extend between the fixed link member 455 and the movable link member 457. The long connecting rod 458 is articulated to the short connecting rod 459 at a centrally located joint 460. The central joint 460 coincides with the cam disc axis 426a. In practice, these parts are arranged in such a manner that the cam disc 426 and the pull wire guide surface 431 rigidly arranged on the cam disc, are non-rotatably connected to a shaft with the long connecting rod 458 and the short connecting rod 459 pivotally supported on the shaft. The short connecting rod 459 is attached in an articulated manner to the fixed link member 455 at a hinge 461a and its opposite end is fixed via a hinge 462a to the movable link member 457. The axes of the hinges 461a and 462a are perpendicular relative to the plane of the FIGS. 6 and 7.

Long connecting rod 458 is connected to the link member 455 by a sliding hinge 461 and to the movable link member 457 by another sliding hinge 462.

The cam disc spring 427 is illustrated as if it acts, on one hand, on the long connecting rod 458, and on the other hand, on the cam disc 426. This arrangement only serves as a schematic illustration, the cam disc spring 427 can also be constructed as a spiral spring, as shown in FIGS. 2a-2d. Preferably, one end of the spiral spring acts on the shaft 460 which is rigidly connected to the cam disc and the other end of the spiral spring acts on the connecting rod 458 or the other connecting rod 459. The direction of the spring force is indicated in FIGS. 6 and 7 by the arrows 445, in FIG. 6, the cams disc spring 427 is only slightly tensioned and the arrow 445 appears correspondingly short, in FIG. 7, the spring tension is high since the cam disc spring 427 is tensioned and, accordingly, the arrow 459 is shown to be considerably longer.

In the embodiment in FIGS. 6 and 7, the readjusting spring 444 acts on both of the connecting rods 458,459 and tends to pull the connecting rod system into the position shown in FIG. 7. Accordingly, in FIG. 6, the spring 444 is tensioned as indicated by its length, while in FIG. 7 the spring is untensioned as displayed by its short length. The spring 444 is only a schematic illustration. Preferably, a spiral spring is used which tends to rotate the two connecting rods 458,459 in directions opposite to one another, in the same manner as the tension spring shown in FIGS. 6 and 7. The spiral spring is arranged so that it acts on both of the connecting rods 458, 459, and the spring may be arranged concentrically with the axis of rotation 460.

The position in FIGS. 6 corresponds to that in FIG. 2a, while the position in FIG. 7 corresponds to that in 2c. The intermediate positions of FIGS. 2b and 2d are not shown.

Figure 8:
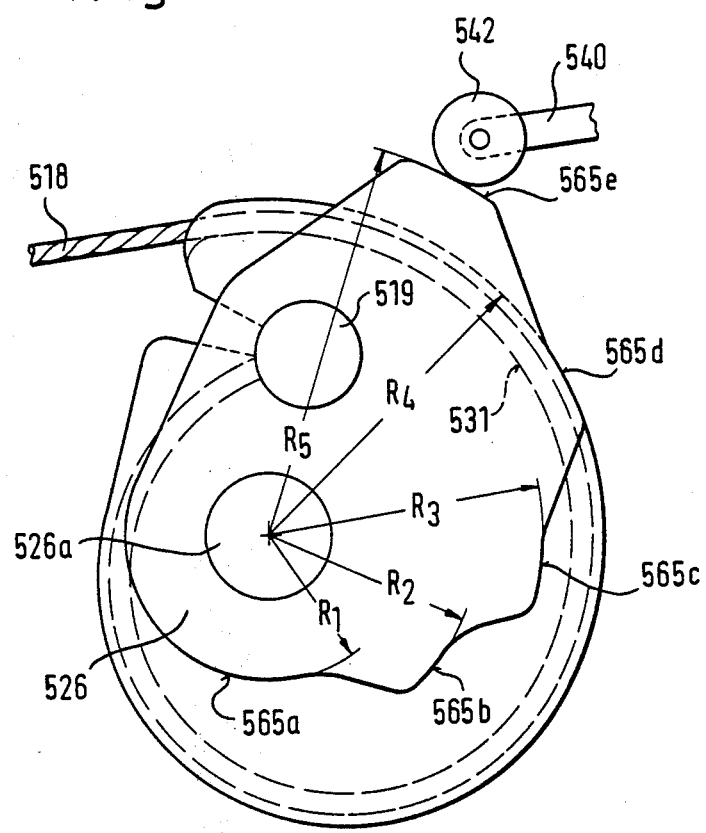
FIG. 8 exhibits an especially advantageous embodiment of a cam disc used in the chain-shifting device of the present invention.

In FIG. 8 an improved shape of a cam disc 526 is illustrated. FIG. 8 shows the cam disc shaft 526a rigidly connected to the cam disc 526 to which two connecting rods are rotatably supported, such as the connecting rods 458, 459 in FIGS. 6 and 7. A pull wire guide surface 531 is formed as a groove in the cam disc in which the pull wire 518 is hidden. At its end, the disc is fastened to an end member 519. Cam disc follower 542 is shown supported on the end of support arm 540, shown only in part, the circumferential periphery of the cam disc is formed in part of a plurality of surfaces 565a-565e with each surface having a different radius $R_1-R_5$. Each of the surfaces 565a-565e has the same radius for its length in the circumferential direction of the cam disc. Each surface 565a-565e affords a different shift position. Movement of the contact point of the cam disc follower 542 over one of the surfaces 565a-565e has no effect on the adjustment of the cam disc follower 542 and, thus, no effect on the position of the entire guide system, for example, the guide system 412 as shown in FIGS. 6 and 7, so that the position of the guide wheel 408 in FIGS. 6 and 7 does not change. This means that any unintentional movement of the adjusting switch 433 or of the Bowden control 417 has no influence on the adjustment of the guide wheel 408 as long as, in the arrangement shown in FIG. 8, the guide wheel 542 remains in the region of one of the surfaces 565a-565e. There is a considerable advantage to this shifting device in that no maintenance is required, because no readjustments are needed.

Figure 9:
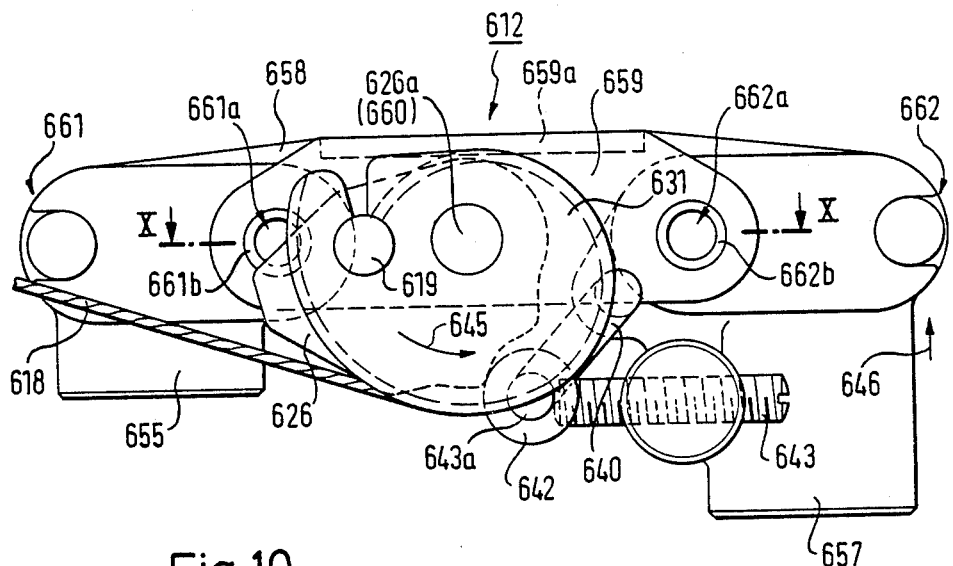
FIG. 9 illustrates the chain-shifting device shown in the schematic arrangement of FIGS. 6 and 7 and viewed in the direction of arrow IX in FIG. 1, it affords an illustration of the structural details of the chain-shifting device.
Figure 10:
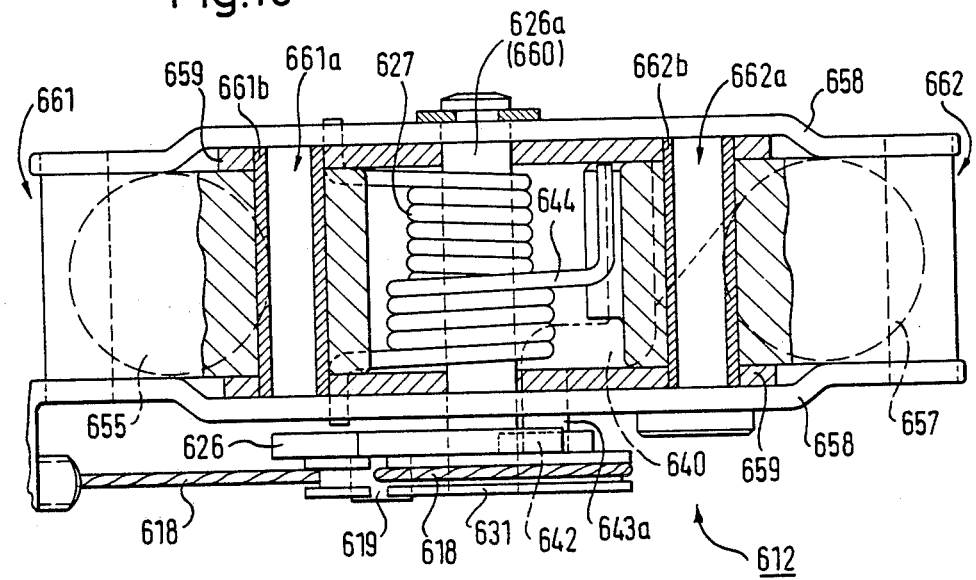
FIG. 10 is a sectional view taken along the line X—X of FIG. 9.

The embodiment shown in FIGS. 9 and 10 corresponds fully to the schematic illustration afforded in FIGS. 6 and 7. Similar parts have the same reference numerals as in FIGS. 6 and 7, however with the reference numerals being increased by 100.

FIG. 9 provides a top view in the direction of the arrow IX in FIG. 1, and FIG. 10 is a sectional view taken along the line X—X in FIG. 9. Kinematically speaking, the embodiment in FIGS. 9 and 10 corresponds to that shown in FIGS. 6 and 7, however, in the arrangement of FIGS. 9 and 10, the connecting rods 658, 659 are provided in double and are located symmetrically on opposite sides of the guide system 612. The spacing between the double connecting rods 658,659 is based on the thickness dimension of the link members 655, 657. In FIG. 9, connecting rod 659 has a rear wall 659a which, in the sectional view afforded by FIG. 10, is not visible and, therefore, permits a view into the interior of the guide system 612. FIG. 9 affords a view of the guide system from the bottom and, for sake of clarity, the lower portion of the connecting rod 658 has been omitted. As a result, the sliding hinges 661, 662 are seen between the link members 655 and 657 on the one hand and between the connecting rods 658 on the other. Furthermore, the lower portion of the connecting rod 659 can be seen, with the rear wall 659a shown in dashed lines. Pull wire guide surface 631 is shown with the cam disc 626 being shown, for the most part, in phantom. Pull wire 618 extends around the guide surface 631 and terminates at the end support 619. Guide surface 631 and cam disc 626 are non-rotatably mounted on the axis of rotation 660. The hinges 661a, 662a between the ends of the connecting rod 659 and the two link member 655, 657 are illustrated by the sleeves 661b, 662b. Furthermore, this view shows the lever 640 rotatably supported on the link member 657 and the stop 643 positioned on the lever. An adjusting screw 643 is arranged in the link member 657 and serves to adjust the stop 643a and for the basic adjustment of the entire guide system 612. FIG. 10 affords a side view of the guide system 612 along the partial sectional line X—X through the connecting rod 659 and also through the sleeves 661b, 662b and partially through the link members 655,657. The pull wire guide surface 631 along with the guide disc 626 are rigidly arranged on the axis of rotation 626a. The double connecting rods 658,659 can be rotated about the axis of rotation 626a. Also extending around the axis or rotation 626a are two springs 627, 644. The spring 644 provides the initial tension for the guide system 612 in the direction of arrow 646, by bearing against the rear wall 659a of the connecting rod 659 and against the connecting rod 658. Spring 657 provides the initial tension along the pull wire guide surface 631 or on the cam disc 626 in the direction of arrows 645. Spring 627 is connected at one end to the axis of rotation 626a and at its other end it is supported by one of the connecting rods 658 or 659. In FIG. 10 the position of the lever 640 is also shown. The lever 640 is rotatably mounted on the link member 657 with its axis of rotation extending parallel to the axis of rotation 626a. Lever 640 has a projection on which the cam disc follower 642 is arranged. The cam disc follower interacts with the cam disc 626. The two sliding hinges 661,662 are in the form of oblong holes in the respective link member 655 or 657 and a corresponding pin extends between the upper and lower connecting rods 659. The ability to slide must exist, since the connecting rods 658,659 have different lengths, the connecting rod 659 is supported in the hinges 661a, 662a and thus, the only possible yielding is in the sliding hinges 661, 662.

By the pull wire-actuated cam disc in connection with at least one spring 627 as shown in FIG. 10, a chain-shifting device is provided which facilitates a selection of the gear even when the vehicle is not moving, that is, when the drive chain is in the stationary position. The selection of the gear can take place in both directions. Spring 644, illustrated in FIG. 10, can be omitted when the pull wire 618 extends outwardly beyond the two hinges 661a and 661 in such a manner that the pull imparts a force on the entire guide system in the direction of arrow 646. In any case, it must be ensured that the force from the spring 627 is higher than the force from the spring 644 in order to be able to perform a shifting procedure in the direction opposite to the arrow 646. Due to the design of the cam disc 626 with different radius portions $R_1-R_5$ in accordance with the individual gears, it is possible to compensate for changes in the length of the pull wire or of the conduit on the pull wire.

While specific embodiments of the invention have been shown and described in detail to illustrate the application of the inventive principles, it will be understood that the invention may be embodied otherwise without departing from such principles.

What is claimed is:

1. A chain-shifting device for a bicycle or the like comprising a frame, an axle mounted on said frame for supporting a driven wheel, a chain wheel unit including a plurality of chain wheels concentrically positioned relative to said axle, said chain wheels having different diameters and being arranged next to one another in the axial direction of said axle, a chain guide wheel, a movable support member rotatably supporting said chain guide wheel, said chain guide wheel being rotatable about an axis disposed in substantially parallel relation with said axle, a fixed support member attached to said frame, guide means supported on said fixed support member, said movable support member secured to said guide means for movement along a path substantially parallel to said axle, an adjusting switch having a plurality of switch positions corresponding at least to the number of said chain wheels, transmission means connected to and extending between said adjusting switch and said guide means for positioning said movable support member via said guide means along the path of movement of said movable support member, an endless chain engageable with said guide wheel and selectively engageable with said chain wheels on said chain wheel unit for driving said axle, said movable support member being locked in position when said chain engaged on said chain guide wheel is not moving, said adjusting switch being displaceable into another position when said movable support member is in the locked position, said guide means including readjustment means for moving said movable support member into another position corresponding to the changed position of said adjusting switch when said movable support member is released from the locked position when said chain commences to move over said chain guide wheel, wherein the improvement comprises that said guide means includes a linkage arrangement comprising a first linkage part connected to said movable support member, a second linkage part articulated at one end thereof to said first linkage part, said first and second linkage parts being movable relative to one another, a cam disc rotatably mounted on said second linkage part with said cam disc being rotatable between angularly spaced end positions, a cam disc follower attached to said first linkage part, and said readjustment means connected to said first linkage part for maintaining said cam disc follower in contact with said cam disc when said chain is moving.

2. Chain-shifting device, as set forth in claim 1, wherein said transmission means comprises a pull wire attached at one end to said adjusting switch and at the other end to said cam disc.

3. Chain-shifting device, as set forth in claim 2, wherein said transmission means comprises a Bowden control.

4. Chain-shifting deivce, as set forth in claim 1, wherein said cam disc has a plurality of peripheral circumferentially extending surfaces, each of said surfaces having a constant diameter for the circumferential length thereof, and each said surface having a different radius from each of the other surfaces.

5. Chain-shifting device, as set forth in claim 1, wherein said guide means comprises said first linkage part, said second linkage part, and a third linkage part secured to said frame and to the opposite end of said second linkage part from the end connected to said first linkage part, said first linkage part comprising a linear guide rod secured at one end to said movable support member, a linear guide sleeve receiving the opposite end of said linear guide rod from the end connected to said movable support member, and said readjusting means comprising a spring acting between said linear guide sleeve and said linear guide rod for biasing said linear guide rod axially through said linear guide sleeve.

6. Chain-shifting device as set forth in claim 1, wherein said readjusting means comprises a readjusting spring.

7. Chain-shifting device, as set forth in claim 6, wherein said readjusting means includes a cam disc spring attached to said cam disc, said cam disc spring in combination with said transmission means arranged to introduce a force into said guide means for moving said disc follower toward said cam disc.

8. Chain-shifting device, as set forth in claim 1, wherein a cam disc spring biases said cam disc rotationally about the axis thereof into a limiting angular position.

9. Chain-shifting device, as set forth in claim 8, wherein said cam disc spring is tensioned even when said cam disc is in the limiting angular position.

10. Chain-shifting device, as set forth in claim 8, wherein said adjusting switch is movable in a first direction and in a second direction opposite to said first direction, when said adjusting switch is moved in the first direction with said movable support member locked because the chain is stationary, the movement of said adjusting switch is transmitted through said transmission means to said cam disc and said cam disc is rotated in a first angular direction against the biasing action of said disc spring, during said rotation said cam disc is separated from contact with said cam disc follower, when said adjusting switch is moved in the second direction with said movable support member locked because the chain is in the stationary position, a tightening device is attached to said transmission means, and said transmission means does not affect the position of said cam disc and said cam disc is prevented from rotating in a second direction opposite to the first direction due to the contact with said cam disc follower.

11. Chain-shifting device, as set forth in claim 10, wherein said transmission means includes a pull wire extending between said adjusting switch and said cam disc, and said tightening device in engagement with said pull wire for taking up play in the pull wire.

12. Chain-shifting device, as set forth in claim 8, wherein said adjusting switch is angularly displaceable in a first direction and in a second direction opposite to the first direction, when said movable support member is locked because said chain is in the stationary position, movement of said adjusting switch in the first direction releases said cam disc for rotation due to the biasing action of said cam disc spring in a first rotational direction and during movement in the first rotational direction said cam disc separates from contact with said cam disc follower and said transmission means are adjusted by said cam disc, said transmission means including a storage spring, when said adjusting switch is moved in the second direction due to an elastic deformation of said storage spring in said transmission means, said movement in the second direction does not displace said cam disc and said cam disc is prevented from rotating in the opposite direction to the first rotational direction by contact with said cam disc follower.

13. Chain-shifting device, as set forth in claim 12, wherein said transmission means comprises a pull wire connected at one end to said adjusting switch and at the other end to said cam disc, and said spring located in said pull wire intermediate the ends thereof.

14. Chain-shifting device, as set forth in claim 1, wherein said guide means comprises a parallelogram link, said parallelogram link comprising said first linkage part and a third linkage part spaced from and extending in generally parallel relation with said first linkage part, said second linkage part connected at one end to said first linkage part and at the opposite end to said third linkage part, and a fourth linkage part disposed in generally parallel relation and spaced laterally from said second linkage part and extending between said first linkage part and said third linkage part.

15. Chain-shifting device, as set forth in claim 14, wherein said readjusting means comprises a readjusting spring connected at one end to said connection of said second linkage part to said first linkage part and at the other end to said fourth linkage part.

16. Chain-shifting device, as set forth in claim 14, wherein said third linkage part is fixed to said frame.

17. Chain-shifting device, as set forth in claim 1, wherein said guide means comprises said first linkage means fixed to said movable support member, said second linkage part comprising a first connecting rod hingedly connected to one end of said first linkage part, a second connecting rod hingedly connected to the other end of said first linkage part, a third linkage part hingedly connected to each of the opposite ends of said first and second connecting rods opposite the ends thereof connected to said first linkage part, said first and second connecting rods articulated to one another intermediate the ends of each of said first and second connecting rods.

18. Chain-shifting device, as set forth in claim 17, wherein said readjusting means comprises a spring secured at one end to said first connecting rod and at the other end to said second connecting rod.

19. A chain-shifting device for a bicycle or the like comprising a frame, an axle mounted on said frame for supporting a driven wheel, a chain wheel unit including a plurality of chain wheels concentrically positioned relative to said axle, said chain wheels having different diameters and being arranged next to one another in the axial direction of said axle, a chain guide wheel, a movable support member rotatably supporting said chain guide wheel, said chain guide wheel being rotatable about an axis disposed in substantially parallel relation with said axle, a fixed support member attached to said frame, guide means supported on said fixed support member, said movable support member secured to said guide means for movement along a path substantially parallel to said axle, an adjusting switch having a plurality of switch positions corresponding at least to the number of said chain wheels, transmission means connected to and extending between said adjusting switch and said guide means for positioning said movable support member via said guide means along the path of movement of said movable support member, an endless chain engageable with said guide wheel and selectively engageable with said chain wheels on said chain wheel unit for driving said axle, said movable support member being locked in position when said chain engaged on said chain guide wheel is not moving, said adjusting switch being displaceable into another position when said movable support member is in the locked position, said guide means including readjustment means for moving said movable support member into another position corresponding to the changed position of said adjusting switch when said movable support member is released from the locked position when said chain commences to move over said chain guide wheel, wherein the improvement comprises that said guide means includes a linkage arrangement comprising at least two linkage parts, said linkage parts being movable relative to one another, a cam disc rotatably mounted on a first of said linkage parts with said cam disc being rotatable between angularly spaced end positions, a cam disc follower attached to the other linkage part, and said readjustment means connected to said linkage arrangement for maintaining said cam disc follower in contact with said cam disc when said chain is moving.

* * * * *